United States Patent

[11] 3,601,157

| [72] | Inventors | Bertram J. Milleville<br>Pittsburgh;<br>Ralph W. Tartaglia, Bethel Park; Harry E. Eminger, Valencia, all of, Pa. |
|---|---|---|
| [21] | Appl. No. | 799,692 |
| [22] | Filed | Feb. 17, 1969 |
| [45] | Patented | Aug. 24, 1971 |
| [73] | Assignee | Rockwell Manufacturing Company<br>Pittsburgh, Pa. |

[54] PRESSURE BALANCED VALVE
9 Claims, 8 Drawing Figs.

[52] U.S. Cl. .................................................. 137/630.14,
                                                        137/630.22
[51] Int. Cl. ........................................................ F16k 11/14
[50] Field of Search ............................................ 137/630.13,
                                630.14, 630, 630.19, 630.22

[56] References Cited
UNITED STATES PATENTS

| 1,867,195 | 7/1932 | Teller | 137/630.14 |
| 2,275,132 | 3/1942 | Crosthwait | 137/630.13 |
| 2,869,584 | 1/1959 | Gordon | 137/630 |
| 3,428,090 | 2/1969 | Hose | 137/630.14 |

Primary Examiner—Clarence R. Gordon
Attorney—Strauch, Nolan, Neale, Nies & Kurz

ABSTRACT: A pressure-balancing valve construction in which upstream line pressure is used to maintain a main valve closure member in a closed position. An auxiliary valve connected to the valve stem and positioned within the main valve is first opened to balance the pressures across the main valve before the main valve is opened through a lost motion connection between it and the stem. The critical valve components, i.e., the main valve and auxiliary valve closure members, are readily removable to permit quick and economical repair of the overall valve assembly.

INVENTORS
BERTRAM J. MILLEVILLE
RALPH W. TARTAGLIA
HARRY E. EMINGER
BY Strauch, Nolan, Neale, Nies & Kurz
ATTORNEYS

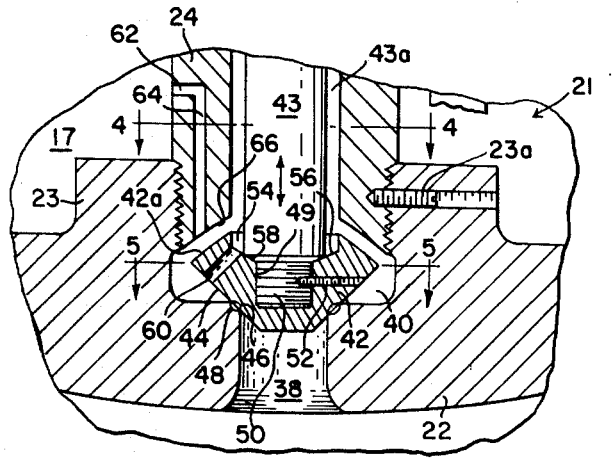
FIG. 3
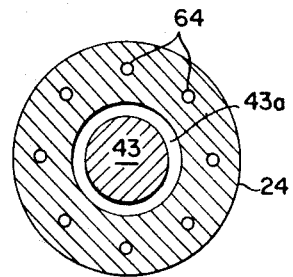
FIG. 4
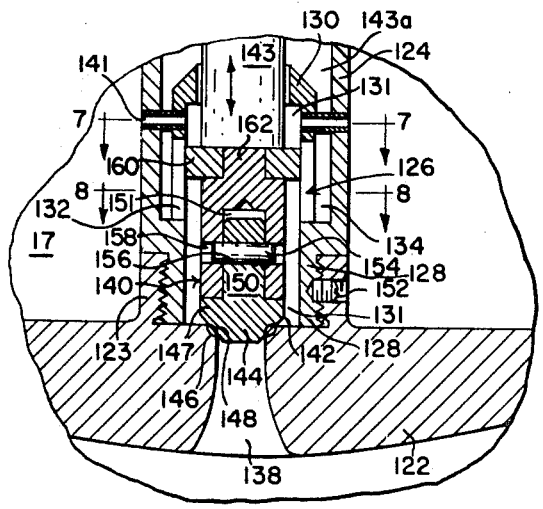
FIG. 6
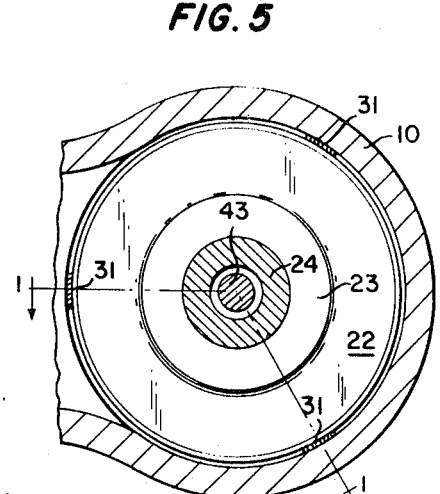
FIG. 5
FIG. 2
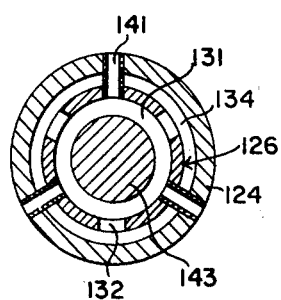
FIG. 7
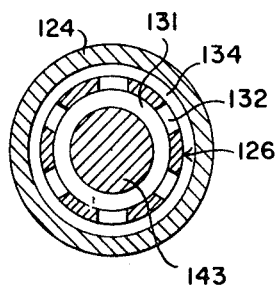
FIG. 8
INVENTORS
BERTRAM J. MILLEVILLE
RALPH W. TARTAGLIA
BY HARRY E. EMINGER
Strauch, Nolan, Neale,
Nies & Kurz
ATTORNEYS 3,601,157

PRESSURE BALANCED VALVE

BACKGROUND OF THE INVENTION

This invention relates generally to valves and, more particularly, to a pressure-balanced valve construction useful under high temperature and pressure-operating conditions and capable of forming a droptight seal when fully closed and of balancing the pressures on the opposite ends of the valve closure member to facilitate opening with a minimum of operating effort.

Conventional valves used under such service conditions have often been subjected to early failure and malfunctioning due to rapid erosion and deterioration of their sealing areas and critical valve components. These previous shortcomings were due in large part to the necessity of relatively massive elements to assure operation against the operating conditions under which these valves must perform.

Prior art attempts to furnish pressure-balanced valves of the type with which the invention is concerned and the measures previously conceived to solve the problems related to high pressure differentials on opening and closing those valves have been generally successful, but have been characterized by the manifestation of certain operating problems.

SUMMARY OF THE INVENTION

Accordingly, a primary object of this invention resides in the provision of a pressure-balanced valve which utilizes a novel bypass arrangement for introducing the desired pressure level upon a piston actuator assembly to facilitate prompt and efficient valve opening or closing.

A further primary object of this invention resides in the provision of a multiplicity of ports arranged to cooperate with a novel bypass valve arrangement to instantaneously produce and maintain the desired pressure levels at selected locations to aid in the prompt operation of the valve.

A further object of this invention resides in the provision of a novel pressure-balanced valve which utilizes high upstream pressure to maintain the valve closure member in a fully closed position and which, immediately prior to opening the valve, balances the pressures at opposite ends of the valve closure member to permit ready opening thereof.

Another object resides in the provision of a novel pressure-balanced valve construction including a main valve and an auxiliary pilot valve and incorporating a unique porting arrangement controlled by the auxiliary pilot valve, the main valve being maintained fully closed by upstream pressure when the auxiliary valve is closed, with the auxiliary valve upon opening thereof causing balancing of the pressures at opposite ends of the main valve by blocking certain of the ports and opening others, to permit ready and easily opening thereof.

Another object resides in the provision of a novel pressure-balanced valve construction with greatly reduced necessary operating force, which then allows a smaller operator to be used in association with the valve, and smaller energy-storage components for fail-safe operation.

Another object resides in the provision of a pressure-balanced valve of simple construction and reduced requirement for operating power which has greatly reduced wear on the critical members, thereby providing a longer life and greater reliability.

A still further object resides in the provision of a novel pressure-balanced valve of a simple compact construction including a main valve disc member removably connected to a main valve piston actuator assembly slidable within the valve casing and an auxiliary pilot valve centrally located within the main valve disc and actuator assembly and connected to the valve stem, the pilot valve controlling the flow of fluid around the main valve by means of a novel porting arrangement to balance the pressures thereacross immediately prior to opening thereof and also providing lost motion connection between the main valve actuator assembly and the valve stem to permit the pressures to be balanced upon initial upward movement of the valve stem and then to subsequently open the main valve through the main actuator upon continued upward movement of the valve stem. To further enhance the service life of the removable main valve disc and auxiliary valve member, the seating surfaces are constructed of a hardened metallic material such as Stellite to resist wear and erosion under severe operating conditions. Additionally, a continuous peripheral groove is provided in the main valve disc adjacent its seating surface to impart a limited degree of flexibility thereto, thus enabling it to conform to slight distortions, such as may be caused by severe piping strains or rapid changes in temperature, in the body seating surface to insure the formation of a droptight seal.

Other objects and advantages of the invention will become apparent from the following detailed description of the several embodiments and from a reading of the appended claims.

BRIEF DESCRIPTION OF THE DRAWINGS

FIG. 2 is a section along line 2—2 of FIG. 1;

FIG. 3 is an enlarged sectional view of the auxiliary pilot valve and lost motion connection between the actuating stem and main valve member of the valve of FIG. 1;

FIG. 4 is a sectional view along line 4—4 of FIG. 3 illustrating the passageways by which the upstream fluid is conducted to the top of the main valve actuator piston when the valve is in the fully closed position;

FIG. 5 is a sectional view along line 5—5 of FIG. 3 illustrating the angular passageways in the auxiliary pilot valve which bleed the top of the main valve actuator piston to the downstream side of the main valve closure disc when the pilot valve is in its raised fully open position;

FIG. 6 is a sectional view of an alternative auxiliary pilot valve and lost motion connection arrangement useful with the pressure-balanced valve of FIG. 1;

FIG. 7 is a sectional view along line 7—7 of FIG. 6 illustrating the radial passageways which conduct upstream fluid to the top of the main valve actuator piston when the main valve and pilot valve are fully closed; and FIG. 8 is a section along line 8—8 of FIG. 6 illustrating the bleed passageways operative when the pilot valve is opened to balance the pressures on the opposite ends of the main valve.

DETAILED DESCRIPTION OF THE PREFERRED EMBODIMENTS

Figure 1:
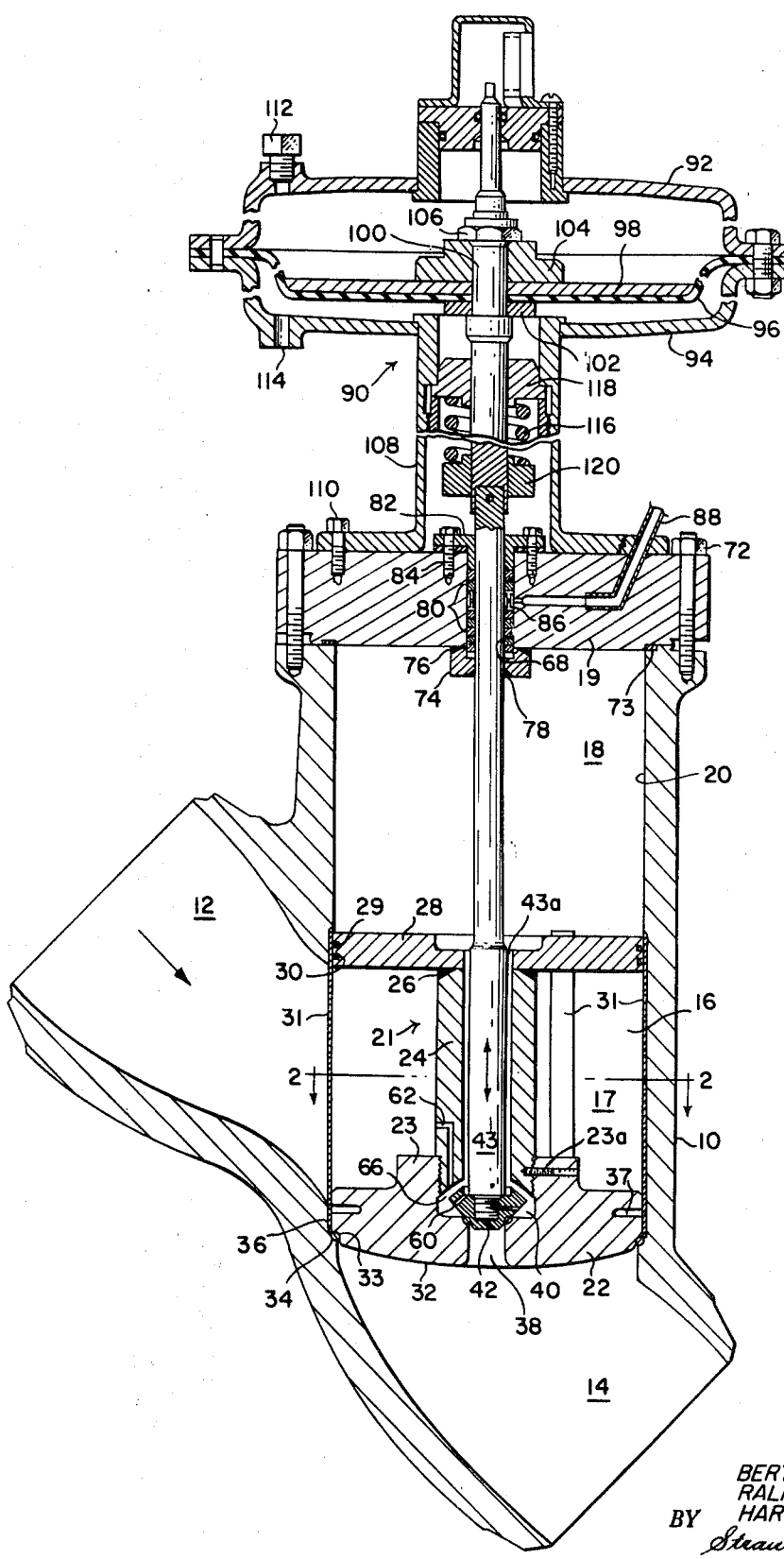
FIG. 1 is a fragmentary sectional view of the first embodiment of the invention along line 1—1 of FIG. 2.

Referring now to FIG. 1, the body 10 of the valve has a pair of flow passages 12 and 14 intersected at an approximate 45° angle by the lower portion 17 of a cylindrical valve chamber 16, the upper portion 18 of the chamber being defined by the cylindrical bore 20 closed by a cover plate 19.

Within chamber 16 is a main valve member 21 including a cylindrical disclike closure member 22 having a hub 23 which is threadedly connected to the lower end of an upright tubular shaft 24 and is secured against rotation thereon as by set screw 23a. Shaft 24 is welded at 26 to a circular piston plate 28 slidable within bore 20. Plate 28 has annular peripheral recesses 29 receiving sealing rings 30 which engage the wall of bore 20 to provide a pair of annular seals between valve body 10 and piston 28.

As shown in FIGS. 1 and 2, closure disc 22 is spaced from body 10 and guided for vertical movement within the lower chamber portion 17 by three equiangularly spaced corrosion and wear resistant Stellited disc guides 31 suitably provided in the valve body.

The valve disc 22 has a substantially spherically contoured bottom surface 32 with an integral annular Stellite or like hard metal alloy seat 33 formed thereon to cooperate with a similar annular Stellite seat 34 integral with body 10 at the intersection of outlet passageway 14 and the lower cylindrically formed portion 36 of chamber portion 17, the outer periphery of disc 22 being received within portion 36 when the valve disc is in the fully closed position shown in FIG. 1.

The disc 22 has a continuous peripheral groove 37 extending therearound to impart limited localized flexibility to the outer peripheral portion of the disc adjacent the annular seating surface 33 to permit this seating surface to adjust to slight distortion in the body-seating surface 34, and thus ensure the formation of a droptight seal. This specific structure is disclosed and claimed in copending application Ser. No. 601,220 assigned to Rockwell Manufacturing Company the assignee of this application.

Disc 22 also includes a central downwardly diverging aperture 38 generally circular in cross section and communicating with a central auxiliary chamber 40 formed at the base of hub 23. An auxiliary valve 42 is received within chamber 40 and is threadedly connected to the lower end of a stem 43 that extends upwardly through shaft 24 in spaced relation therewith to define an annular fluid passageway 43a connecting chambers 18 and 40. Stem 43 extends outwardly through cover 19 and is motivated by a conventional pneumatic actuator assembly.

Referring now particularly to FIG. 3, the auxiliary valve 42 has an upper substantially spherically contoured actuating surface 42a and a lower frustoconical seating surface 44 with an integral Stellite seat portion 46 which, when the valve is closed as in FIG. 3, engages the Stellite seat 48 at the upper frustoconical mouth portion of aperture 38 to form an annular seal between the aperture and chamber 40. Valve 42 has a threaded circular recess 49 secured on the reduced threaded end 50 of stem 43 and fixed against rotation thereon as by a setscrew 52. The upper portion of valve 42 has an enlarged recess 54 with a frustoconical bottom 56 that intersects the upper edge of threaded recess 49 and flushly engages tapered stem flange portion 58 when assembled as in FIG. 3. A plurality of circular passageways 60 extend from recess bottom 56 through the valve 42 and intersect the bottom conical surface 44 at substantially right angles to communicate passageway 43a and recess 54 with chamber 40 when the valve 42 is in its raised open position. While 12 passageways 60 are shown in FIG. 5, the actual number provided may be varied but must be sufficient to provide a rapid pressure bleed from chamber portion 18 to outlet port 14 when relief valve 42 is fully opened to balance the pressures across main valve 21.

Tubular shaft 24 has a plurality of radial circular passageways 62 intersected by vertical passageways 64 which communicate at their lower ends with chamber 40. It is to be noted that, while eight passageways 62, 64 are shown in FIG. 4, the actual number used may be varied but must be sufficient to act through passageway 43a to upper chamber portion 18 to maintain pressure in the upper chamber 18 when the valve is being operated from an opened position to the closed position more rapidly than would be possible if the means utilized were the leakage past the piston 28. The passages 62 provide a means of communicating the upper chamber 18 with inlet port 12 when the valve is being operated from an opened position to the closed position. In this condition, during the closing movement, the pressure on valve disc 22 is essentially balanced, and the movement of stem 43 in a closing direction (downward as viewed in FIG. 1) allows the chamber 18 to be connected through passages 43a and 62 to the inlet port 12, balancing the pressure on piston plate 28.

The lower surface 66 of shaft 24 is spherically contoured to conform to the upper surface 42a of valve member 42. When the valve is closed as shown in FIG. 1, relief valve surface 42a is spaced from shaft surface 66 to provide a lost motion actuating connection between the stem 43 and the main valve tubular shaft 24.

Upon the initial upward movement of stem 43 and relief valve 42 when the valve is being operated from the closed position, valve surface 42a engages mating surface 66 and blocks the passages 64, preventing the upstream fluid from moving through the bypass 62, 64. This produces maximum balancing across the valve because then the fluid in chamber 18 then is connected with outlet 14 through passages 43a and 60, while passages 64 are blocked.

As illustrated in FIG. 1, the stem 43 extends upwardly through central aperture 68 in cover 19 removably secured to body 20 by bolt assemblies 72 with a sealing ring 73 provided therebetween. A bottom collar 74 welded at 76 to cover 19 has an internal Stellite back seat 78 engaging stem 43, the collar serving as a bottom retainer for suitable packing rings 80 compressed around stem 43 by a top adjustable retainer ring 82 connected to cover 19 by screws 84. Located between the upper and lower packing rings 80 is a metallic spacer 86 around which high pressure lubricant is pumped by means of lubricating assembly 88 to assist the packing rings 80 in insuring a fluidtight seal around operating stem 43.

The operator for valve stem 43 may be of any conventional type, but typically is of a remotely pneumatic diaphragm operated type which may be similar to that illustrated in U.S. Pat. No. 3,298,389. The actuator assembly 90 comprises upper and lower shells 92, 94 which peripherally clamp a flexible diaphragm 96 having a central reinforcing plate 98. An actuator rod 100 extends through diaphragm 96, reinforcement plate 98, and a pair of spacers 102, 104 and is securely attached to these members by a nut 106. The actuator assembly is provided with an annular fitting 108 bolted to cover 70 by suitable bolt assemblies 110. Interchangeable vent and pressure line connections 112 and 114 are provided to permit actuation of the diaphragm in either direction. A spring 116 is compressed between a fixed collar 118 and a collar 120 on actuating rod 100 to bias the valve toward closed position.

In operation, when valve 21 is in the closed position of FIGS. 1 and 3, with closure disc 22 seated on seat 34 high upstream pressure line fluid from inlet port 12 passes into chamber portion 17, through passageways 62, 64 and into auxiliary chamber 40. Because the auxiliary valve 42 is also closed as shown, the line fluid pressure will pass upwardly through annular passageway 43a into the upper chamber portion 18 and will exert a downwardly closing force across the top surface of piston plate 28 to maintain the main valve disc member 22 in a fluidtight sealing relationship with the body seat 34.

When it is desired to open main valve 22, diaphragm 96 is activated to move valve stem 43 upward. This causes an initial upward movement of auxiliary valve 42 relative to valve 22 and opens central aperture 38 to bleed the high pressure fluid from chamber portion 18 downwardly through annular passageway 43a into auxiliary chamber 40 and out through aperture 38 to outlet port 14. After stem 43 has been raised a sufficient distance, the upper surface 42a of the valve 42 engages the mating shaft surface 66 to block the passageways 64 and block upstream pressure from chamber 40. The pressure bleed from the top of piston 28 continues through annular passageway 43a, recess 54, valve openings 60, auxiliary chamber 40 and central opening 38 to equalize and balance the pressure on the top surface of piston 28 with the downstream pressure on the bottom surface 32 of valve 22. Since valve 42 is now solid with valve 22 further upward displacement of stem 43 unseats main valve 22. Since the effective area of the top surface of plate 28 and the valve bottom surface 32 are substantially equal, the main valve disc 22 is now pressure balanced and is readily opened without requiring excessive actuating stem loads.

Referring now to FIGS. 6, 7 and 8, an alternative auxiliary or relief valve construction is illustrated. In this embodiment, the valve disc 122 includes a threaded hub 123 secured to the reduced threaded end 128 of hollow shaft 124 and locked against rotation thereon by setscrew 152. The lower end of tubular shaft 124 includes an upright cylindrical boss 126 integral with the end 128 and terminating in an inwardly extending annular flange 130 closely surrounding but spaced from valve stem 143, the boss 126 and end 128 defining an auxiliary chamber 131. The boss has a plurality of vertical slots 132 which connect an annular passage 134 between tubular shaft 124 and boss 126 in fluid communication with auxiliary chamber 131 within which the bottom end of stem 143 and auxiliary valve assembly 140 are received. A plurality of tubular conduits 141 preferably generally elliptical in shape extend between tubular shaft 124 and boss 126 and connect the portion of chamber 17 surrounding shaft 124 in fluid communication with auxiliary chamber 131.

The auxiliary valve member 142 includes a lower frustoconical portion 144 with an annular integral Stellite seat portion 146 and an upper cylindrical portion 147 having a circular rod 150 extending into the circular end recess 151 of stem 143. A pin 154 snugly extends through aligned rod hole 156 and stem aperture 158 to secure valve element 142 on the stem 143. A cylindrical collar 160 is received around the reduced stem portion 162 and moves within the boss 126 to open and close conduits 141 as will be described below.

With the relief valve 142 closed and seat 146 engaging its mating frustoconical Stellite seat 148 at the mouth of opening 138 as shown in FIG. 6, the main valve disc 122 will be held in the fully closed portion as shown in FIG. 1 by upstream line fluid pressure which passes through conduits 141 into chamber 131, outwardly through slots 132 into passageway 134, and upwardly through annular passageway 143a to chamber portion 18, thereby providing high pressure line fluid within chamber portion 18 which imposes a closing force upon the top surface of piston 28 to maintain the main valve disc 122 in a fully closed position. Piston 28 is rigid with shaft 124, and the mounting and actuating mechanism for shaft 43 are the same as in FIGS. 1–5.

To open the main valve disc 122, stem 143 is moved upwardly by the actuator to open auxiliary valve 142 and bleed the fluid pressure from chamber portion 18 through annular passages 143a, 134, slots 132, auxiliary chamber 131 and opening 138 into the outlet port 14. When collar 160 abuts solidly against flange 130, it is positioned to close conduits 141 to stop the flow of line fluid into chamber 131, and the bleed will continue to rapidly balance the pressures across the top of piston 28 and bottom of disc 122, thereby rendering the disc easily openable upon continued upward movement of stem 143, as in the earlier embodiment.

It is apparent that in both embodiments of FIGS. 3–5 and FIGS. 6–8 the critical valve components, i.e., the main valve closure disc and the auxiliary valve closure element, which are subjected to the most severe service conditions are readily removable from their respective actuator shaft and stem. Hence, when these parts have deteriorated after extended usage, they are easily and quickly replaced without having to replace the entire valve assembly.

Additionally, the novel, simple, lost motion connection between the stem and main valve closure disc enables high pressure line fluid to be used to hold the valve closed and provides for a rapid balancing of pressures across the valve immediately before the main disc is actuated by the valve stem. This results in very reliable and dependable valve operation in which a droptight seal is formed under the most severe operating conditions without, however, requiring the use of excessively high stem loads to open or close the valve.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desired to be secured by Letters Patent is:

1. A valve construction comprising a body having inlet and outlet ports intersecting an intermediate chamber, one portion of which is defined by a bore in said body, a cover for said bore, means providing a valve seat between said chamber and said outlet port, a main valve closure member mounted for movement between open and closed positions in said chamber and having a seating surface adapted to sealingly engage said valve seat when said main valve is closed, main valve actuator means including a tubular shaft to one end of which said main valve closure member is removably connected, piston means connected to the other end of said shaft and slidable within said bore, said main valve closure member having an opening aligned with said tubular shaft and an auxiliary valve seat surrounding said opening, a valve stem extending through said tubular shaft, said bore, and said cover, said stem spaced from said tubular shaft to define an annular passageway therebetween, an auxiliary valve member removably connected to one end of said stem and having a seating surface engaging said auxiliary seat when said auxiliary valve member is in a closed position, lost motion means operatively connecting said stem with said tubular shaft, fluid passage means in said shaft establishing fluid communication between said intermediate chamber and said annular passageway to conduct upstream fluid through said passageway to said bore when said main and auxiliary valves are closed, means connecting said annular passageway with said main valve opening when said auxiliary valve is fully opened and means disconnecting said passageway and said shaft fluid passage means when said auxiliary valve is fully opened, whereby when the main and auxiliary valve members are closed the fluid pressure in said bore acts upon said piston means to seat said main valve member and when said auxiliary valve member is opened said fluid pressure in said bore bleeds through said annular passageway and said main valve opening to balance the pressure acting on said piston means with that downstream of said main valve member and thereby permit said main valve member to be readily opened.

2. A valve construction as in claim 1, said main valve member being disc-shaped and being spaced from said piston means within said intermediate chamber by said tubular shaft, said piston means including peripheral sealing means engaging the wall of said bore and sealing said bore from said intermediate chamber when said main valve is closed.

3. A valve construction as in claim 1, said auxiliary valve member having an actuating surface spaced from a coacting mating surface on said tubular shaft when said auxiliary valve is closed, said surfaces providing said lost motion connecting means between said stem and said tubular shaft, whereby upon movement of said stem said pressure bleed is established before said auxiliary valve actuating surface engages said shaft mating surface to open said main valve member.

4. A valve construction as in claim 3, said shaft fluid passage means terminating at one end at said shaft mating surface, said auxiliary member actuating surface blocking said shaft fluid passage means upon engagement with said shaft mating surface to disconnect said annular passageway from said intermediate chamber, said auxiliary valve member including aperture means providing said means connecting said annular passageway with said main valve opening when said auxiliary valve is fully opened.

5. A valve construction as in claim 1, said lost motion connecting means including a hollow boss member connected to said one end of said stem and terminating in an end flange and a collar on said stem positioned within said boss member and spaced a distance from said end flange when said auxiliary valve member is closed, whereby after said stem is moved said spaced distance to engage said collar with said end flange, said main valve member will be opened.

6. A valve construction as in claim 5, said shaft fluid passage means extending through said boss member and communicating the interior of said boss member with said intermediate chamber, said boss member comprising fluid passageway means connecting said shaft passage means with said annular passageway when said auxiliary valve member is closed and said annular passageway with said main valve opening when said auxiliary valve is fully opened with said collar engaging said end flange and blocking said shaft passage means.

7. A valve construction as in claim 1, said main valve closure member construction comprising a continuous peripheral groove in the region adjacent said main valve seating surface to impart localized flexibility to said valve member, thereby enabling it to conform to distortion in said valve seat and ensuring the formation of a droptight seal.

8. A valve assembly for a pipeline conducting fluid under pressure comprising a body having a through passage provided with an annular seat, a main valve member comprising a disc adapted to engage said seat in closed position, means providing an opening through said disc, an auxiliary valve member adapted to close said opening in the closed condition of said valve assembly, fluid pressure responsive means connected to said disc and having an actuating chamber, a valve stem connected to said auxiliary valve member, an actuator for said valve stem, passage means operable when both the main and auxiliary valve members are in closed position for applying upstream line pressure to the actuating chamber for said pressure responsive means to urge said disc onto its seat in said body, said passage means comprising an auxiliary chamber surrounding said auxiliary valve means, an inlet conduit connecting said auxiliary chamber to upstream line pressure, and an annular passage section defined by a tubular shaft of small diameter compared to said disc disposed in the connection between the disc and pressure responsive means closely surrounding the stem for connecting the auxiliary chamber in fluid communication with said actuating chamber, means providing a lost motion coupling between said auxiliary valve member and said main valve member whereby initial opening movement of the valve stem by said actuator displaces the auxiliary valve member with respect to said main valve member to sequentially uncover said opening and solidly couple said valve members together, means movable with said auxiliary valve member adapted to close said conduit to block upstream fluid pressure from said passage means, said auxiliary chamber being connected through said opening to the line downstream of said valve assembly when said auxiliary valve is displaced to apply downstream line pressure to said fluid pressure responsive means so that when further movement of said valve stem by said actuator displaces said main valve member from its seat pressure balance will have been substantially reestablished on opposite sides of said main valve member so as not to materially interfere with opening movement of said main valve member.

9. A valve assembly for a pipeline conducting fluid under pressure comprising a body having a through passage provided with an annular seat, a main valve member in the form of a disc adapted to engage said seat in closed position, means providing a central opening through said disc, an auxiliary valve member adapted to seat upon and close said opening in the closed condition of said valve assembly, a valve stem connected to said auxiliary valve member, a pressure responsive actuator for said valve stem, a piston disposed in a piston chamber in said body, means solidly connecting said piston to said disc comprising a tubular shaft rigid at opposite ends with said piston and said disc, said tubular shaft being of relatively small diameter as compared to said disc and surrounding said stem so as define between the shaft and stem an annular passageway leading to said piston chamber, means for applying upstream line pressure to said piston chamber to urge said disc onto its seat in said body, means providing a lost motion coupling between said auxiliary valve member and said disc whereby initial opening movement of the valve stem by said actuator displaces the auxiliary valve member with respect to said disc to uncover said opening, and means defining a passageway section through said auxiliary valve member that connects said annular passage means to the line downstream of said valve assembly through said opening to connect said piston chamber to downstream line pressure upon said initial opening movement of said valve stem so that pressure balance is substantially established on opposite sides of said main valve member so as not to materially interfere with opening of said main valve member, said lost motion coupling means being effective on further movement of said auxiliary valve member to solidly couple the disc and auxiliary valve member.